United States Patent
Teshima et al.

[11] 3,888,756
[45] June 10, 1975

[54] APPARATUS FOR TREATING WATER CONTAINING IMPURITIES

[75] Inventors: Toru Teshima, Hadano; Toshiie Nagasao, Machida; Minoru Tanaka, Hachioji; Kazuo Ariga; Kiyoshi Inoue, both of Tokyo, all of Japan

[73] Assignees: Stanley Denki Kabushiki Kaisha, Tokyo, Japan; Kabushiki Kaisha Inoue Japax Kenkyusho, Kanagawa, Japan

[22] Filed: July 23, 1973

[21] Appl. No.: 381,409

[30] Foreign Application Priority Data
July 28, 1972 Japan.................................. 47-75754
July 26, 1972 Japan.................................. 47-74875

[52] U.S. Cl................................. 204/275; 204/149
[51] Int. Cl.² .. B01D 13/02; C02B 1/82; C02C 5/12
[58] Field of Search ...... 204/149, 151, 152, DIG. 1, 204/275

[56] References Cited
UNITED STATES PATENTS
| | | |
|---|---|---|
| 3,616,356 | 10/1971 | Roy..................................... 204/152 |
| 3,716,459 | 2/1973 | Salter et al......................... 204/149 X |
| 3,719,570 | 3/1973 | Lancy................................ 204/149 X |
| 3,728,238 | 4/1973 | Tarjanyi et al.............. 204/DIG. 10 X |
| 3,764,499 | 10/1973 | Okubo et al...................... 204/149 X |
| 3,766,034 | 10/1973 | Veltman ............................. 204/149 |

Primary Examiner—John H. Mack
Assistant Examiner—A. C. Prescott

[57] ABSTRACT

An apparatus for treating water containing impurities by the use of an electrolytic cell, at least one pair of main electrodes opposed in the electrolytic cell to each other, a power source connected to the main electrodes, and a plurality of auxiliary electrodes disposed in pieces between the main electrodes, in which the auxiliary electrodes are uniformly arranged in a mutually close relationship but insulated by nonconductive materials between the main electrodes so as to avoid any short circuit between the main electrodes. The nonconductive materials may be disposed in pieces so as to form a mixed filler layer together with the auxiliary electrodes or may be a plurality of porous plastic holders.

13 Claims, 9 Drawing Figures

APPARATUS FOR TREATING WATER CONTAINING IMPURITIES

This invention relates to an apparatus for the treatment of water to remove therefrom impurities, such as heavy metallic ions, cyanides, suspensions, mud, coloring matter, silica, organic ions and compounds.

A conventional apparatus for the electrolytic treatment of industrial wastewater has been proposed, in which two plate-type main electrodes are oppositely provided to each other in an electrolytic cell, and in which a number of grained-auxiliary metal electrodes are provided between the main electrodes so as to swim along the current of the treated wastewater. The main electrodes are connected to terminals of a DC source to form a closed loop circuit including the main electrodes, the treated wastewater and the grained-auxiliary metal electrodes. An inlet pipe is inserted to the bottom of the electrolytic cell, while an outlet pipe is coupled to the top of the electrolytic cell. A plurality of nozzles are provided on the inlet pipe in the electrolytic cell.

In the above conventional apparatus, wastewater to be treated is flowed in the electrolytic cell from the nozzles of the inlet pipe, so that the grained-auxiliary metal electrodes are swimmed along the current of the wastewater and electrolyzed in the wastewater to purify the wastewater.

However, it is difficult in the conventional apparatus to uniformly swim the grained-auxiliary metal electrodes along the current of the wastewater, so that a high electrolyzation efficiency cannot be obtained. Moreover, since the wastewater must be injected from the nozzles of the inlet pipe in the electrolytic cell at a relatively high pressure to effectively provide the current of the wastewater, another device is necessary to produce jet currents of the wastewater. This device requires an extra space and raises the cost of the apparatus. Moreover, if the pressure of the jet current is lowered, or if other undesirable conditions, such as unnecessary plenty of the grained-auxiliary metal electrodes or nonuniform currents of the wastewater, the grained-auxiliary metal electrodes swim at a biased condition or further sink in the bottom of the electrolytic cell so as to cause a short circuit between the main electrodes. This also causes a loss of power and a lowering of the electrolyzation efficiency.

An object of this invention is to provide an apparatus for electrolytic-treating water using metal electrodes in a substantially complete manner at a high electrolyzation efficiency and at a low operation cost.

In accordance with this invention, an apparatus is provided for treating drinking water or wastewater containing impurities by the use of an electrolytic cell, at least one pair of main electrodes opposed in the electrolytic cell to each other, a power source connected to the main electrodes, and a plurality of auxiliary electrodes disposed in pieces between the main electrodes, characterized in that said auxiliary electrodes are uniformly arranged in a mutually close relationship but insulated by nonconductive materials between the main electrodes so as to avoid any short circuit between the main electrodes. The nonconductive materials are disposed in pieces so as to form a mixed filler layer together with said auxiliary electrodes. The nonconductive materials may be a plurality of porous plastic holders.

The principle, construction and operations of this invention will be clearly understood from the following detailed description taken in conjunction with the accompanying drawings, in which.

Figure 1:
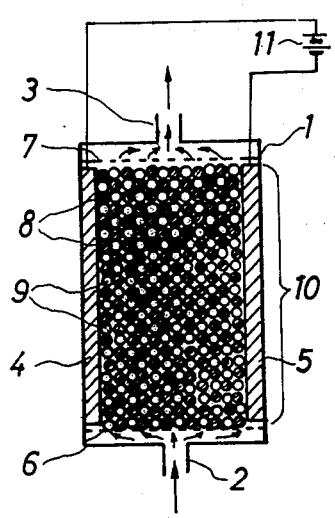
FIG. 1 is a longitudinal section illustrating an embodiment of this invention.
Figure 2:
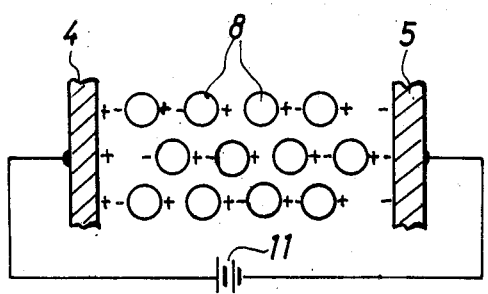
FIG. 2 is a schematic section explanatory of the principle of this invention.

With reference to FIG. 1, an embodiment of this invention comprises an electrolytic cell 1 of continuous system having an inlet 2 at the bottom and an outlet 3 at the top. A pair of opposed main electrodes 4 and 5 are provided in the electrolytic cell 1. If the electrolytic cell 1 is conductive, the main electrodes 4 and 5 are also insulated from the electrolytic cell 1. Small spaces are necessary at the bottom and the top of the electrolytic cell at the ends of the main electrodes 4 and 5. The main electrodes 4 and 5 are provided along the side wall of the electrolytic cell 1, so that the wastewater to be treated passed only at the opposed sides of the main electrodes 4 and 5. A plurality pairs of opposed main electrodes may be provided in parallel. Various formation of the main electrodes 4 and 5 may be also adopted in addition to the plate-type electrodes. The material of the main electrodes is of graphite, stainless steel, aluminum, iron, or other conductive materials. Filters 7 and 6 of plastic sheet, net or porous plate are respectively provided at the top portion and the bottom portion of the electrolytic cell 1. In this case, the filter 6 is usually fixed while the filter 7 is exchangeably seated. In the current path of the wastewater to be treated, auxiliary electrodes 8 of grained-type, block-type, powder-type or foil-type are filled in pieces together with nonconductive materials 9 disposed in pieces to form a mixed filler layer 10. The mixing ratio of the auxiliary electrodes 8 and the nonconductive material 9 may be determined so as to be suitable for the contents of the wastewater to be treated. In this case, a formation of a short circuit between the opposed main electrodes 4 and 5 by the auxiliary electrodes 8 must be avoided. The mixed filler layer 10 may be formed by simply mixing the auxiliary electrodes 8 and the nonconductive materials 9. However, the filler layer 10 may also be formed by solidifying the auxiliary electrodes 8 and the nonconductive materials 9 therebetween or together with the main electrodes 4 and 5, if necessary. The main electrodes 4 and 5 are connected to a DC source 11.

In operation, if the wastewater to be treated, such as industrial wastewater, is introduced from the inlet 2 into the electrolytic cell 1, the wastewater passes through the mixed filler layer 10 and is then exhausted from the outlet 3. If the electrolytic cell 1 is formed into a batch type, the wastewater is filled in the mixed filler layer 10. Thereafter, if a DC voltage is applied between the main electrodes 4 and 5, a loop circuit is electrochemically formed by the auxiliary electrodes 8 and the wastewater in the mixed filler layer 10. Accordingly, a face of each auxiliary electrode 8 opposed to the plus electrode 5 assumes the minus polarity, while a face of each auxiliary electrodes 8 opposed to the minus electrode 4 assumes the plus polarity. In this case, the electrolytic-reduction reaction is performed at each of the minus polarity faces and the minus electrode 4 so as to separate metal for example, while the electrolytic-oxidization reaction is performed at each of the plus polarity faces and the plus electrodes 5 so as to melt-in metal or to dissolve-out cyanic ions for example. As a result of the above reactions, harmful substances in the wastewater can be effectively purified by decomposition or other removal treatment. The materials of the main electrodes 4 and 5, the auxiliary electrodes 8 and the nonconductive material 9 are selected so as to be suitable for the wastewater to be treated.

Actual example of this invention will be described in detail below.

EXAMPLE 1

Figure 3:
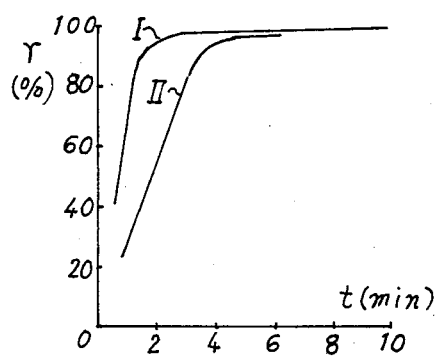
FIGS. 3, 4, 5 and 6 are characteristic curves explanatory of test results of the apparatus of this invention.

1. In a plastic electrolytic cell having dimensions 10 centimeters (cm) by 10 cm by 20 cm in depth, a pair of graphite main electrodes are opposed at a distance of 7.5 cm while graphite balls having an average diameter of 6 millimeters are mixed at a ratio of 4 to 5 with glass balls having substantially the same average diameter of 6 millimeters to form a mixed filler layer between the main electrodes. The solution of 550 milliliters containing cyanic ions at a rate of 150 ppm is filled in air gaps in the mixed filler layer, and a DC voltage is applied across the main electrodes. Characteristic curves I and II shown in FIG. 3 were obtained under the above conditions in the batch system. In FIG. 3, the abscissa and the ordinate are respectively the treated time $t$ in minute and the treated rate $r$ of cyanic ions in percent (%). As understood from FIG. 3, the cyanic ions can be treated within a short time at a small electric power by electrolytic oxidization and decomposition. If the distance between the main electrodes is reduced, the necessary voltage across the main electrodes can be of course lowered.

2. Under substantially the same conditions, a high treatment rate was also obtained by the continuous system.

3. Under the conditions of the item (1), substantially the same result was obtained by replacing the DC source by an AC source.

4. In the same apparatus as mentioned in item (1), when the solution containing nickel ions at a rate of 104 ppm was treated under a DC voltage of 80 volts across the main electrodes, successive treated rate of 54%, 62%, 82% and 92% at successive treatment times of 2.5 minutes (min), 5 min., 10 min. and 15 min. respectively by electrolytic reduction and separation.

EXAMPLE 2

Figure 4:
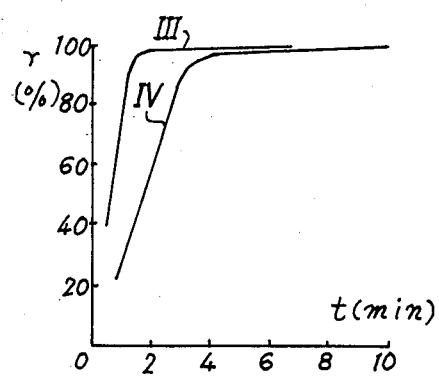

1. In a plastic electrolytic cell having dimensions 10 cm by 10 cm by 20 cm in depth, a pair of graphite main electrodes are opposed at a distance of 7.5 cm while active carbon balls having an average diameter of 3 millimeters are mixed at a ratio of 1 to 1 with small-grained gravel substantially the same average diameter of 3 millimeters to form a mixed filler layer between the main electrodes. The solution containing cyanic ions at a high concentration is filled in the mixed filler layer and electrolytic-treated by a DC current. Thereafter, the solution of 500 milliliters containing cyanic ions at a rate of 190 ppm is filled in the mixed filler layer and electrolytic-treated by the DC current. Characteristic curves III and IV shown in FIG. 4 obtained in the batch system. These high treated rates were obtained by a smaller current in comparison with the results shown in FIG. 3, since the cyanic ions are adsorbed by the active carbon balls and then electrolytic-oxidized thereon so as to raise the treated rate.

2. After the above treatment of the item (1), when the solution of the same concentration is fillted, successive treated rates of 50%, 60% and 80% were obtained at successive treated times of 2.5 minutes (min), 5 min. and 10 min. respectively under no application of the DC voltage to the main electrodes by adsorption.

Thereafter, when a DC voltage of 80 volts is applied to the main electrodes after the solution of the same concentration is again filled in the mixed filler layer, successive treated rate of 98% and about 100% were obtained at successive treatment times of 3 minutes and within ten minutes respectively. As understood from the above results, cyanic ions can be effectively adsorbed and decomposed by the mixed filler layer including active carbon balls.

3. After hypochlorous acid ions were saturated in the active carbon balls in the same apparatus as mentioned in item (1), when water containing hypochlorous acid ions of 2 ppm was continuously flowed under application of 30 volts across the main electrodes, the treated water contained the hypochrolous acid ions only at a concentration of 0.1 ppm. At the same time, the particular smell peculiar to the hypochlorous acid ions was eliminated. When the applied DC field was then removed, the concentration of the hypochlorous acid ions in the treated water was the same as that of the water to be treated. As understood from the above results, if an electric voltage is applied to the mixed filler layer including active carbon balls saturated with the hypochlorous acid ions, the hypochlorous ions can be further adsorbed because of the increase of adsorption function. However, the adsorption function of the active carbon balls is lost in response to the removal of the applied electric voltage.

4. After sodium hypochlorite were adsorbed to the active carbon balls in the same apparatus as mentioned in item (1), when solution of 500 milliliters containing cyanic ions at a concentration of 190 ppm was filled in the mixed filler layer, a better treated rate than the results shown in FIG. 4 was obtained in the batch system. Therefore, if cyanic ions are adsorbed and electrolyzed on the active carbon ions adsorping the sodium hypochlorite, oxidization-decomposition reaction and electrolytic-oxidization reaction of the cyanic ions are caused by the hypochrolous acid ions. Sodium chloride caused by decomposition of the sodium hypochlorite raises the electric conductivity. Hypochlorous acid ions are then caused by electrolysis of the sodium chloride and act as an oxidization agent for the cyanic ions. Sodium hydroxide caused at the same time also raises the electric conductivity so as to increase the efficiency of electrolytic oxidization.

EXAMPLE 3

Figure 5:
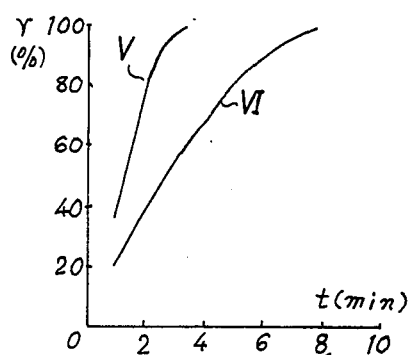

In a plastic electrolytic cell having dimensions 10 cm by 10 cm by 20 cm in depth, a pair of graphite main electrodes are opposed at a distance of 7.5 cm while granular duralumin of 5 millimeters (mm) in diameter by 5 mm in length is mixed at a volume ratio of 2 to 5 with glass balls of an average diameter of 5 mm to form a mixed filler layer between the main electrodes. The solution of 550 milli-liters containing nickel ions at a concentration of 104 ppm is filled in the mixed filler layer, and a DC voltage is applied across the main electrodes. Under the above conditions, characteristic curves V and VI were obtained as shown in FIG. 5 in the batch system. In this operation, the nickel ions are coverted to nickel hydroxide $Ni(OH)_2$, which is removed by cohesion and co-precipitation with aluminum hydroxide $Al(OH)_3$ electrolytic-dissolved from the granular duralumin. Accordingly, the wastewater was treated within a short time by a small electric current.

The similar results were obtained by the use of an AC voltage in place of the DC voltage. The duralumin can be replaced by aluminum, iron, magnesium, zinc, or alloy including one of them as the main component. Since these hydroxide substances have the cohesion-coprecipitation action, organic suspension, turbidity, coloring matter, silica and other metallic ions can be effectively eliminated in a short time in addition to reduction of chromic acid by dissolved metals.

EXAMPLE 4

Figure 6:
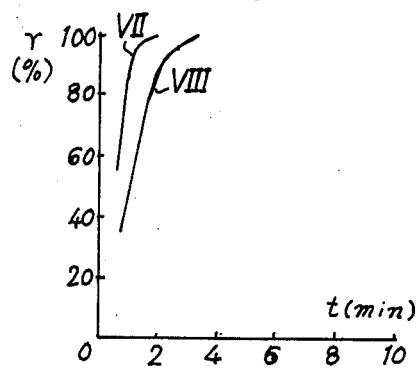

In a plastic electrolytic cell having dimensions 10 cm by 10 cm by 20 cm in depth, a pair of graphite main electrodes are opposed at a distance of 7.5 cm while granular duralumin of 5 millimeters (mm) in diameter by 5 mm in length is mixed at a volume ratio of 2 to 5 with calcium carbonate $CaCO_3$ (i.e. marble) blocks of the similar volume to form a mixed filler layer between the main electrodes. The solution of 550 milliliters containing nickel ions at a cencentration of 104 ppm is filled in air gaps of the mixed filler layer, and a DC voltage is applied across the main electrodes. Under the above conditions, characteristic curves VII and VIII were obtained as shown in FIG. 6 in the batch system. In this operation, the nickel ions are converted to nickel hydroxide $Ni(OH)_2$ by neutralization caused by physically, chemically and electrochemically dissolved calcium carbonate $CaCO_3$ and aluminum hydroxide $Al(OH)_3$. The produced nickel hydroxide $Ni(OH)_2$ is eliminated by the cohesion and co-precipitation actions of aluminum hydroxide $Al(OH)_3$. This result was obtained in a shorter time in comparison with the result shown in FIG. 5 under the same current. The calcium carbonate blocks may be replaced by other alkaline blocks, such as calcium oxide CaO or sodium carbonate $Na_2CO_3$, or by a mixture with non-alkaline, nondissolve and nonconductive material.

From the point of view of the high efficient treatment or the industrial processing, the above mentioned examples can be combined with one another. In this case, a combination may be provided by the use of a plurality of electrolytic cells, which perform different examples of the above treatments. Moreover, a combination may be provided by the use of a single electrolytic cell, which performs some of the above mentioned examples of treatments. Accordingly, a plurality of mixed filler layers may be provided in a single electrolytic cell to be suitable for different treatments.

As mentioned above, the anode of the main electrodes 4 and 5 was of graphite or metal to be dissolved for electrolytic metal-dissolving treatment, while the cathode of the main electrodes 4 and 5 was of graphite or metal, such as stainless steel for the same purpose. In a case of eleectrolytic oxidization treatment of cyanic ions, graphite and stainless steel were respectively suitable for the anode and cathode. As the auxiliary electrodes 8, grained metal to be dissolved and graphite balls were respectively suitable for the case of electrolytic metal-dissolving treatment and for the case of electrolytic oxidization treatment. Moreover, as the nonconductive material 9, glass balls, plastic balls, small gravels and small stones were suitable because of acid proof, alakali proof, and uniform distribution of gaps in the mixed filler layer. As mentioned with reference to Example 4, while alkaline blocks may be individually employed, they may be combined with nondissolve material, such as glass balls.

In general, a higher operation temperature is desirable because of the high reaction speed. However, the room temperature may be also employed. Since the treatment is continuously performed, the temperature of the treated wastewater will raise so as to raise the treatment efficiency.

Moreover, the apparatus of this invention has the filter function against insoluble dust, and the filtered dust was readily removed by washing treatment by a backward stream of crean water.

If all of the main electrodes 4, 5 and the auxiliary electrode material 8 are of metal and if a DC voltage is applied across the main electrodes, an oxidization film and scale are respectively produced on the anode and the cathode respectively so as to reduce the electrolytic efficiency. These film and scale can be effectively eliminated by soaking in the acidic or alkaline solution, by injecting air, by superimposing an AC current, by alternating exchanging the plug and minus polarity for the main electrodes, or by electrolyzation by an AC current.

Figure 7:
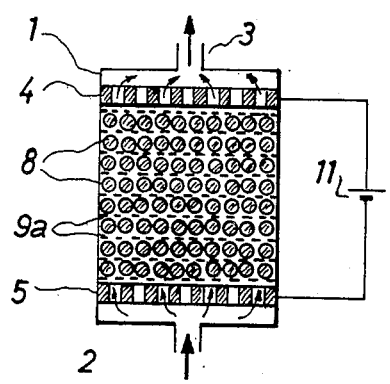
FIG. 7 is a longitudinal section illustrating another embodiment of this invention.

With reference to FIG. 7, another embodiment of this invention comprises a plurality of nonconductive holders 9a, such as thin plastic porous plates, nets or coarse cloths. The auxiliary electrodes 8 are held by the nonconductive holders 9a so as to be mutually insulated, so that any short circuit is not formed between the main electrodes 4 and 5. Since the freely movable area of each auxiliary electrode 8 is restricted in a substantially complete manner by the nonconductive holders 9a, a good result was obtained by the use of the embodiment shown in FIG. 7.

Figure 8:
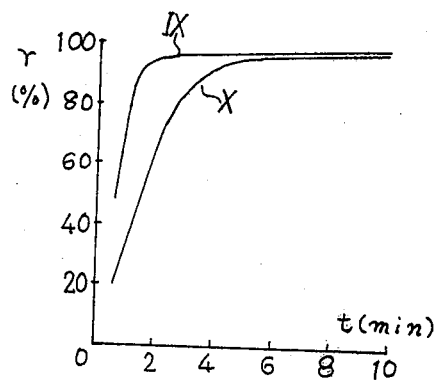
FIG. 8 is characteristic curves explanatory of the test results in the apparatus shown in FIG. 7.

In an example, 10 layers of the auxiliary electrodes 8 were provided by the use of plastic nets of a dimension of 15 centimeters (cm) by 15 cm. In this case, graphite balls having a diameter of 7 millimeters were employed as the auxiliary electrodes 8. Four thousand three to four hundred graphite balls in number were provided in the 10 layers of the auxiliary electrodes 8. Under the above conditions, the solution of 580 milliliters containing sodium cianide NaCN at a concentration of 118 ppm was filled in the electrolytic cell 1 while a DC voltage was applied across the main electrodes 4 and 5. The result of this actual example is shown in FIG. 8, in which a curve IX corresponds to a condition of DC 80 volts and 1.9 amperes and a curve X corresponds to a condition of DC 50 volts and 1.0 amperes. From FIG. 8, it will readily understood that cyanic ions were treated in a short time by a low power.

Figure 9:
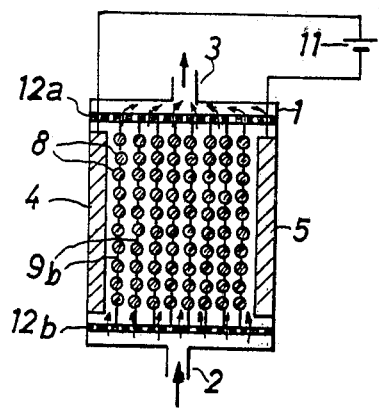
FIG. 9 is a longitudinal section illustrating another embodment of this invention.

The holders 9b may be provided in parallel with current direction of the treated water as shown in FIG. 9. In this case, if supporters 12a and 12b are of nonconductive material, the holders 9b may be conductive to avoid any short circuit between the main electrodes 4 and 5. In the example shown in FIG. 9, a good result similar to the results shown in FIG. 8 was obtained.

In the examples shown in FIGS. 7 and 9, the holders 9a may be solidified with the auxiliary electrodes 8 by the use of the same material.

As mentioned in detail above, since the auxiliary electrodes 8 are closely arranged in this invention but avoiding any short circuit between the main electrodes, the substantial distance between the main electrodes is very small. Moreover, the auxiliary electrodes 8 are uniformly distributed in the entire space of the electrolytic cell 1, while the entire surface area of the electrodes is effectively wide. Accordingly, wastewater containing cyanic compounds at a low concentration can be treated in a short time, while it is very difficult to treat such wastewater by conventional apparatus. In the conventional apparatus, since the concentration of cyanic compounds cannot be reduced by a relatively high value (e.g. 1000 ppm) by electrolytic oxidization, a final treatment using chemical agents is necessary. However, wastewater containing cyanic ions can be completely treated only by electrolytic oxidization in accordance with this invention.

Electrolytic reduction treatments can be performed at a high efficiency at a low operation temperature within a short treatment time by the use of a small electrolytic cell. Since the auxiliary electrodes 8 are fixed in the mixed filler layer 10 by the holders 9a, 9b, further gaining of the auxiliary electrodes 8 due to mutual collision thereamong are effectively avoidable as well as the turbidity of the treated water.

If active carbon balls are employed as the auxiliary electrodes 8, impurities may be adsorbed to the active carbon balls according to the physical or chemical function, and the adsorbed impurities may be treated as mentioned in detail above in accordance with this invention. The treated active carbon balls can be again employed.

Moreover, good drinking water having no smell of hypochlorous acid ions can be obtained as described in item (3) of Example 2.

What we claim is:

1. An apparatus for treating water containing impurities, comprising:
   an electrolytic cell;
   at least one pair of main electrodes opposed in the electrolytic cell;
   a power source connected to the main electrodes;
   a plurality of auxiliary electrodes disposed in pieces between the main electrodes; and
   holder means of nonconductive materials in particulate form employed for insulating said auxiliary electrodes thereamong to uniformly arrange in a mutually close relationship so as to avoid any short circuit between said main electrodes.

2. An apparatus according to claim 1, in which said auxiliary electrodes are filled between the main electrodes together with said holder means of nonconductive materials disposed in pieces so as to form a mixed filler layer having air gap, the water being filled in the air gap.

3. An apparatus according to claim 2, in which said auxiliary electrodes are formed by at least one of graphite, active carbon, iron oxide, and lead oxide.

4. An apparatus according to claim 2, in which said auxiliary electrodes are formed by active carbon, and in which hypochlorous acid ions are adsorbed on the active carbon.

5. An apparatus as set forth in claim 4, in which means is provided to alternatively repeat connection and nonconnection of said power source to the main electrodes.

6. An apparatus according to claim 2, in which said auxiliary electrodes are formed by at least one of aluminum, iron, magnesium, zinc, or alloy including one of them as the main component to dissolve out the hydroxide substance thereof.

7. An apparatus according to claim 2, in which said auxiliary electrodes are formed by at least one of aluminum, iron, magnesium, zinc, or alloy including one of them as the main component to dissolve out the hydroxide substance thereof, and in which said nonconductive materials are formed by at least one alkaline substance to dissolve out hydroxide ions, where impurities in the water are converted to hydroxide substances and then treated by cohesion and co-precipitation.

8. An apparatus according to claim 1, in which said auxiliary electrodes are held between the main electrodes by use of said holder means of nonconductive material comprising a plurality of porous plastic holders.

9. An apparatus according to claim 8, in which said auxiliary electrodes are formed by at least one of graphite, active carbon, iron oxide, and lead oxide.

10. An apparatus according to claim 8, in which said auxiliary electrodes are formed by active carbon, and in which hypochlorous acid ions are adsorped on the active carbon.

11. An apparatus as set forth in claim 10, in which means is provided to alternatively repeat connection and nonconnection of said power source to the main electrodes.

12. An apparatus according to claim 8, in which said auxiliary electrodes are formed by at least one of aluminum, iron, magnesium, zinc, or alloy including one of them as the main component to dissolve out the hydroxide substance thereof.

13. An apparatus according to claim 8, in which said auxiliary electrodes are formed by at least one of aluminum, iron, magnesium, zinc, or alloy including one of them as the main component to dissolve out the hydroxide substance thereof, and in which said nonconductive materials are formed by at least one alkaline substance to dissolve out hydroxide ions, whereby impurities in the water are converted to hydroxide substances and then treated by cohesion and co-precipitation.

* * * * *